March 2, 1971   A. J. SUCHOCKI   3,567,296
SEAL MATERIAL FOR DYNAMIC APPLICATION
Filed June 17, 1969
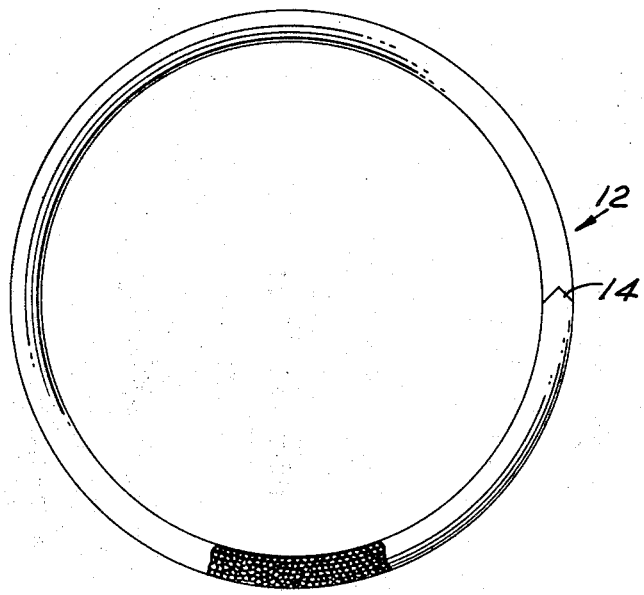
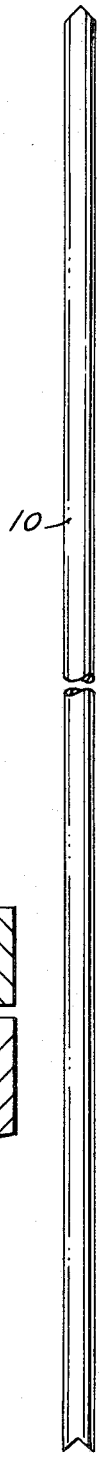
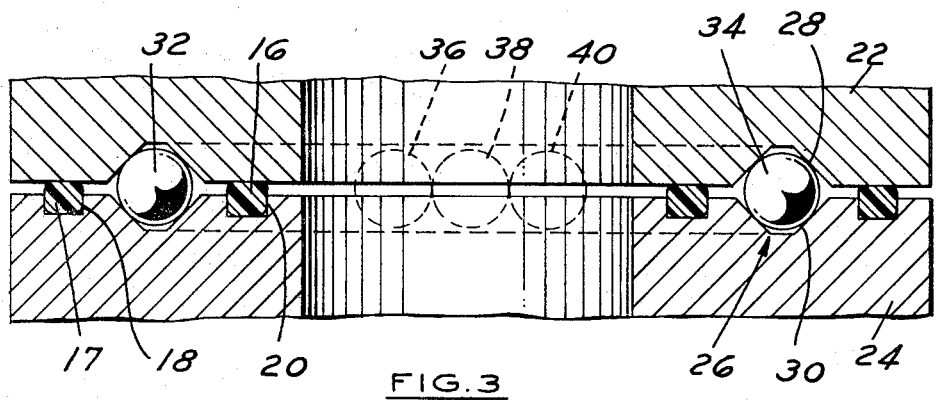
INVENTOR
ANTHONY J. SUCHOCKI
BY Harry M. Saragovitz
Edward J. Kelly
Herbert Berl &
Arthur L. Girard
ATTORNEYS

United States Patent Office 3,567,296
Patented Mar. 2, 1971

3,567,296
SEAL MATERIAL FOR DYNAMIC APPLICATION
Anthony J. Suchocki, Rochester, Mich., assignor to the United States of America as represented by the Secretary of the Army
Filed June 17, 1969, Ser. No. 834,115
Int. Cl. F16c *33/78*
U.S. Cl. 308—187.1                    3 Claims

ABSTRACT OF THE DISCLOSURE

A seal comprising a flexible rod of a polyethylene foam material is disclosed.

---

The present invention relates to seals particularly seals of the type for use in the protection of bearings from outside contamination and more particularly to split ring type seals comprising a flexible rod of a foamed polyethylene.

The use of a wide variety of materials as seals to protect bearings and other structures from contamination by dust, water, air, sand, and almost an unending list of undesirable materials is well known in the art. Many materials including asbestos fibers, a variety of rubber materials and Teflon have been used in such applications at various times. In all of these uses and especially in areas where the seal is introduced between a stationary part and a moving part, or two or more moving parts, a variety of desirable characteristics which a successful seal must possess arise. Among these desirable characteristic are the following:

(1) Provision of compressive force against all surrounding surfaces either stationary or moving;
(2) Low friction in the case of moving parts;
(3) Continuous sealing when no special bonding techniques are utilized;
(4) The ability to utilize relatively broad tolerances;
(5) Immunity of the material to environmental conditions;
(6) Low seal material cost; and
(7) Ease of installation.

Although all of the aforementioned properties are desirable very few seal materials presently utilized incorporate more than a few of them and almost none incorporate them all.

It is therefore the object of the present invention to provide a seal having all of the above described desirable characteristics which seal is commercially feasible and readily available at this time.

Other objects and advantages of the present invention will be made obvious to those skilled in the art when the following description is considered in combination with the accompanying drawings of which:

FIG. 1 is a plan view of the rod structure of the present invention.

FIG. 2 is a partially cut away plan view of a preferred embodiment of the split ring seal of the present invention; and FIG. 3 is a cross sectional view of an application of a preferred embodiment of the seal of the present invention installed in combination with a trunnion or roller type bearing structure.

According to the present invention there is provided as a seal, a foamed polyethylene flexible rod structure. More specifically the invention provides as a seal a flexible rod of polyethylene foam preferably having a density of from about 1.9 to about 2.6 pounds per cubic foot. The invention further teaches the application of a polyethylene foam rod as described above to a trunnion or roller bearing to protect its contiguous races from contamination by dust, water, sand, or other undesirable materials.

Generally the particular shape, size of dimensions of the seal are not critical to the present invention. Any type of seal conventional or otherwise may be made from the polyethylene foam described herein. In the preferred embodiment however foamed polyethylene seals have been found to be particularly useful in areas where sealing must be applied between moving parts. Hence, the seals of this invention will be described primarily in conjunction with such structures.

As shown in FIG. 1 the basic preferred seal structure comprises a simple rod of a foamed polyethylene which rod is flexible and capable of being bent to form the split ring 12 shown in FIG. 2. Although the density of the polyethylene foam utilized in such applications may apparently vary quite widely, preferred results in the form of broadly applicable seals providing good response, low friction, environmental immunity, low cost, and long wear have been attained when the density of the polyethylene foam ranged from about 1.9 to about 2.6 pounds per cubic foot.

As shown in FIG. 2 when the split ring structure 12 is made from the rod 10 of FIG. 1, little or no machining, bonding or other processing is required to close the terminal gap between the two ends of the rod. Although almost any conventional joining cut could be used for this junction the tongue-in-groove type joint 14 of FIG. 2 has been found to provide excellent results.

In the preferred embodiment of the present invention which incorporates the foamed polyethylene seal 10 into a roller bearing or trunnion type structure 15, as shown in FIG. 3, at least one flexible foamed polyethylene rod 16, and preferably two (16 and 17) are placed in suitable grooves 18 and 20 between moving parts 22 and 24. These same moving parts 22 and 24 are permitted movement relative to one another by roller bearing structure 26 comprising a first bearing race 28 in part 22 and a second bearing race 30 in part 24 providing guidance for bearings 32 and 34 which may be of any suitable conventional material or structure and which in combination with the other bearings (not shown) permit rotation between parts 22 and 24.

In this configuration, seal 16 precludes the entry any contaminants from the outer side of the bearing structure. In this fashion the races 28 and 30 are kept free of even very small amounts of debris, dust, sand, water, or oil.

The grooves 18 and 20 in this structure may be of any suitable configuration so long as they provide a means for retaining the seals in place during rotation of parts 22 and 24 relative to each other, and the only critical aspect of the invention lies in the use of a polyethylene foam material having all of the desirable characteristics for such seals were mentioned above.

Foams suitable for use in these sealing applications are commercially available and easily formed according to conventional foaming techniques for polyethylene materials.

I wish it to be understood that I do not desire to be limited to the exact details of construction shown and described, for obvious modifications will occur to a person skilled in the art.

I claim:
1. In combination:
   first and second relatively movable parts;
   a first race in said first movable part;
   a second race in said second movable part;
   bearing means engaging said first and second races when said first and second relatively movable parts are placed in conventionally juxtaposed movable relationship; and at least one seal comprising a flexible rod of a foamed polyethylene having a density of from about 1.9 to about 2.6 pounds per cubic foot, positioned in contacting relationship between said first and second relatively movable parts in the vicinity of said bearing means and said first and second races thereby protecting said bearing means from outside contamination.

2. In combination;

first and second relatively movable parts juxtaposed in functional movable relationship with one another;

bearing means between said relatively movable parts permitting relative movement with reduced friction between said first and second movable parts; and at least one seal comprising a flexible rod of a polyethylene foam having a density of from about 1.9 to about 2.6 pounds per cubic foot positioned in contacting relationship between said first and second relatively movable parts in the vicinity of said bearing means under normal stationary or moving load conditions thereby protecting said bearing means from outside contamination.

3. The combination of claim 2 wherein said bearing means comprises:

a first race in said first movable part:

a second race in said second movable part; and roller bearing means engaging said first and second races when said first and second relatively movable parts are placed in conventionally juxtaposed movable relationship.

References Cited

UNITED STATES PATENTS 3,226,169  12/1965  Housel et al. _____ 308—215

FREDERICK L. MATTESON, JR., Primary Examiner

F. SUSKO, Primary Examiner